United States Patent Office 3,321,422
Patented May 23, 1967

3,321,422
PROCESS FOR CONVERTING WATER SOLUBLE STARCH PRODUCTS TO WATER RESISTANT MATERIALS
William H. Houff, Walnut Creek, and Alan C. Nixon, Berkeley, Calif., assignors to Shell Oil Company, New York, N.Y., a corporation of Delaware
No Drawing. Filed May 11, 1962, Ser. No. 194,160
17 Claims. (Cl. 260—17.4)

This invention relates to a process for converting water soluble materials into water resistant materials. More particularly, the invention relates to a process for converting hydroxy-containing water soluble materials, such as starch, to water resistant materials, and to the use of the process for the preparation of water-resistant adhesives and the like.

Specifically, the invention provide a new and highly efficient process for converting water-soluble hydroxy-containing materials, and particularly starch and starch derivatives to water-resistant materials which comprises contacting and reacting the hydroxy-containing materials with a water-soluble derivative of a high molecular weight polymer of an alpha,beta-ethylenically unsaturated aldehyde, and preferably a polyacrolein-sodium bisulfite adduct, preferably under alkaline conditions.

As a special embodiment, the invention provides a method for preparing a water resistant starch adhesive which comprises mixing the starch with a polyacroelin-sodium bisulfite adduct under alkaline conditions and using this mixture for the bonding of surfaces together and particularly as an adhesive for the preparation of laminated fiber board.

Polyhydroxy-containing materials such as starch have been used in the textile and paper industries for many purposes. Thus, starch has been used as a sizing for paper and textiles, as an adhesive for products such as laminated fiber board and corrugated paper board and in combination with other materials as coatings. Starch has not been entirely satisfactory for these purposes, however, as the resulting sizings, coatings and adhesives have been soluble in water. Resorcinol-formaldehyde and urea-formaldehyde resins have been used to improve the water resistance of the starch compositions but their application is limited due to solution instability and color.

It is an object of the invention, therefore, to provide a new process for converting water-soluble materials and particularly hydroxy-containing materials such as starch to water resistant materials. It is a further object to provide water resistant starch compositions which have good solution stability and color. It is a further object to provide a starch composition which sets up quickly on cure to form an insoluble product. It is a further object to provide a new process for preparing water-resistant starch adhesives. It is a further object to provide a process for preparing water resistant starch sizing compositions. It is a further object to provide a process for preparing water-resistant starch-contining surface coatings. It is a further object to provide a process for adhering surfaces employing a water resistant adhesive. It is a further object to provide a process for bonding surfaces which can be accomplished in a short period of time. It is a further object to provide a process for adhering surfaces which gives a product having good strength and water resistance. It is a further object to provide improved process for preparing laminated fiber board and corrugated paper board. It is a further object to provide paper products containing a water resistant starch composition. These and other objects of the invention will be apparent from the following detailed description thereof.

It has now been discovered that these and other objects may be accomplished by the process of the invention comprising mixing and reacting water-soluble hydroxy-containing materials, and particularly starch and starch derivatives, with a water-soluble derivative of a high molecular weight polymer of an alpha,beta-ethylenically unsaturated aldehyde, and preferably a polyacrolein-sodium bisulfite adduct preferably under alkaline conditions. It has surprisingly been found that this process permits one to convert relatively inexpensive water-soluble materials such as starch and starch derivatives to products having a high resistance to water. The resulting compositions also have excellent adhesion, particularly to cellulosic materials. The process is thus ideally suited for use in the preparation of water-resistant starch adhesives, water-resistant sizings for paper and textiles, and the like. The compositions also have excellent pot life, i.e., stability before cure, as well as good color. The process is particularly effective for use in preparing laminated fiber board and corrugated cardboard as described hereinafter.

The water-soluble materials to be converted to water-insoluble products according to the process of the invention may be any poly-hydroxy-containing water soluble material, such as polyvinyl alcohols, hydrolyzed polyvinyl acetates, and the like, and particularly starches and starch derivatives. The expression "starch" as used herein includes any of the familiar soft, white amorphous powders which are obtained from many different types of plant cells which are carbohydrates and polysaccharides. The expression "starch" also includes modified starches, such as the products obtained by treating starch with oxidizing or chlorinating agents, with cyanoethylating agents, with acetylating agents, and the like. The term also includes dextrinized starches. The starch particles may be swelled or unswelled, i.e., they may have been subjected to treatments such as with boiling water to hydrate the starch and cause the granules to expand or burst.

Examples of such materials include, among others, cereal starches, corn starch, rice starch, wheat starch, potato starch, tapioca starch, root starches, lignocellulose materials as Hemp hurd flour, wood flour, boiled corncob fiber, corncob flour, hypochlorite-oxidized starch, starch converted with enzymes, hydroxyethylated starch, cyanoethylated starch and the like.

The materials to be reacted with the above-described water soluble hydroxy-containing materials include the water-soluble derivatives of high molecular weight polymers of alpha,beta-ethylenically unsaturated aldehydes. These water-soluble derivatives are obtained by treating a substantially water-insoluble high molecular weight polymer of an alpha,beta-ethylenically unsaturated aldehyde as noted below with a solubilizing agent, such as sulfur dioxide, to make the polymer water soluble.

The alpha,beta-ethylenically unsaturated aldehydes used in making the basic polymers comprise those aldehydes having an ethylenic group in an alpha,beta-position relative to the aldehyde group, such as, for example, acrolein, alpha and beta-substituted acroleins, such as, for example, alpha-ethylacrolein, alpha-isobutylacrolein, alpha-amylacrolein, alpha-chloroacrolein, beta-phenylacrolein, alpha-isohexylacrolein, alpha-decylacrolein, beta-isooctylacrolein, alpha-cyclohexylacrolein, and the like, and mixtures thereof. Preferred aldehydes to be employed in making the polymers include the alpha,beta-monoethylenically unsaturated monoaldehydes containing from 3 to 12 carbon atoms, and especially acrolein and the alpha and beta-substituted acroleins wherein the substituent on the alpha and/or beta positions is an alkyl, cycloalkyl, aryl or alkaryl radical containing no more than 8 carbon atoms. 2-alkenals containing up to 8 carbon atoms come under special consideration.

The polymers of the above-described aldehydes also include copolymers of the above-described aldehydes with a dissimilar monomer containing an ethylenic group, such as, for example, acrylonitrile, methacrylonitrile, crotonaldehyde, acrylic acid, methacrylic acid, methyl acrylate, ethyl acrylate, methyl methacrylate, butyl acrylate, vinyl acetate, dibutyl maleate, diallyl phthalate, allyl acetate, allyl benzoate, vinyl chloride, vinylidene chloride, styrene, alpha-methyl styrene, butadiene, methylpentadiene, isoprene, vinylpyridine, N-vinylpyrolidone, acrylamide, N-methyl acrylamide, 1,4-octadiene, divinyl adipate, ethylene, propylene, isobutylene, and the like, and mixtures thereof. Particularly preferred monomers to be employed include the alpha,beta-ethylenically unsaturated nitriles, the alkyl esters of the acrylic and alpha-substituted acrylic acids, vinyl esters of monocarboxylic acids, allyl esters of polycarboxylic acids and monocarboxylic acids, monoolefins, polyolefins, nitrogen-containing monomers as the amides of unsaturated carboxylic acids, vinylpyridine and the N-vinylpyrolidones, all members of the foregoing preferably containing no more than 12 carbon atoms each.

The amount of the above-described unsaturated monomers to be employed with the unsaturated aldehydes in making the copolymers may vary over a wide range. In general, the amount of the dissimilar monomer may vary from about .1% to as high as 80 to 90% by weight of the combined mixture. Preferred amounts of the dissimilar monomer vary from about 1% to 50% by weight of the combined mixture.

The polymers of the above-described unsaturated aldehydes to be used in making the water-soluble derivatives are those obtained by addition polymerization through the double bond of the aldehyde and are preferably those having an intrinsic viscosity of at least 0.3 dl./g. (deciliter per gram) and preferably between 0.5 dl./g. and 3.5 dl./g. These values are determined by the conventional technique of polyelectrolyte (e.g., $Na_2SO_4$) viscosity measurements at 25° C. using the sodium bisulfite derivative of the polymer. As expressed in terms of molecular weight, the preferred polymers have molecular weights ranging from about 20,000 to 10,000,000, said weights being determined by the light scattering technique.

The preferred polymers are those possessing a high theoretical aldehyde function, i.e., when the polymer is subjected to conventional tests for the presence of aldehyde groups (e.g., addition of hydroxylamine hydrochloride and titrated liberated water with Karl Fischer reagent) the results show a high percent, e.g., above about 75%, of the theoretical aldehyde groups present as such or in the hydrated form. Many of the preferred polymers have the aldehyde groups present in the hydrated form as

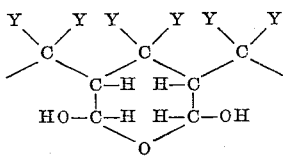

and some

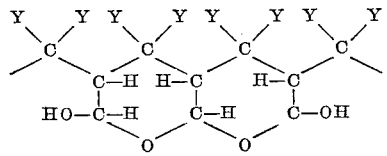

wherein Y is hydrogen or lower alkyl.

The above-described high molecular weight homopolymers and copolymers may be prepared by a variety of different methods. They may be obtained, for example, by polymerizing the monomer or monomers in the presence of free radical yielding catalysts and certain temperature conditions, in the presence of redox polymerization catalysts, or by use of high energy ionizing radiation. Suitable methods for polymerizing the monomers are described and claimed in copending patent application Ser. No. 859,156, filed Dec. 14, 1959, now U.S. Patent No. 3,079,357, issued Feb. 26, 1963, copending application Ser. No. 859,154, filed Dec. 14, 1959, now U.S. Patent No. 3,167,529, issued Jan. 26, 1965, copending application Ser. No. 63,987, filed Oct. 21, 1960, now U.S. Patent No. 3,105,801, issued Oct. 1, 1963, and copending application Ser. No. 95,831, filed Mar. 15, 1961, now U.S. Patent No. 3,081,244, issued Mar. 12, 1963, and so much of the disclosure of these four applications relative to these polymers and their preparation is incorporated into this application.

The preparation of some of the acrolein polymers by the above-noted methods is illustrated below.

POLYMER A 100 parts of acrolein was added to 400 parts of water, to this mixture was added .271 part of potassium persulfate, .203 part of ferrous chloride tetrahydrate, 1 part of nonyl-phenol-ethylene oxide adducts as anti-coalescent agent and .4 part of disodium salt of ethylene diamine tetracetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

POLYMER B 100 parts of acrolein was added to 300 parts of water and to this mixture was added .272 part potassium persulfate, .203 part of ferrous chloride tetrahydrate and .4 part of disodium salt of ethylene diamine tetracetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

POLYMER C 1000 parts of acrolein was added to 2000 parts of water and to this mixture was added 2.73 parts of potassium persulfate, 2.02 parts ferrous chloride tetrahydrate, 10 parts of nonyl-phenol-ethylene oxide condensate and 4 parts of disodium salt of ethylene diamine tetracetic acid. This mixture was stirred for 42 hours at room temperature (20° C.) under nitrogen. The resulting product was a white powder polymer having an intrinsic viscosity of 1.5.

POLYMER D 100 parts of acrolein was added to 325 parts of water and to this mixture was added 2.70 parts of potassium persulfate, 2.00 parts of ferrous chloride tetrahydrate and 4 parts of disodium salt of ethylene diamine tetracetic acid. The mixture was kept at room temperature for 6 hours with stirring and under an atmosphere of nitrogen. The resulting 46 parts product was a white powder polymer having an intrinsic viscosity of 1.02 dl./g.

POLYMER E

Acrolein was added to water to form a 20% solution. A polyacrolein-sulfur dioxide adduct having an intrinsic viscosity of about 2.26 dl./g. was added to form a 0.2% solution. This mixture was placed in a glass reactor and the air swept out with nitrogen. The reactor was sealed and exposed to X-rays at room temperature. The dose rate was $1.8 \times 10^5$ rads per hour. Reaction time was 1½ hours. The reactor was then opened and the solution filtered to remove the solid polymer. The resulting polymer was a white powder having an intrinsic viscosity of 2.23 dl./g.

POLYMER F

Acrolein was added to water to form a 20% solution. Phosphoric acid was then added to form a 1% solution and .2% nonyl-phenol-ethylene oxide adduct was added. This mixture was placed in a glass reactor and air swept out with nitrogen. The reactor was sealed and exposed to an X-ray beam at 25° C. The dose rate was $2.1 \times 10^6$ rads/hour and the total dosage was $1.0 \times 10^6$ rads. The reactor was opened and the solution filtered to remove the solid polymer. The resulting polymer had an intrinsic viscosity of 1.1 dl./g.

The above-described high molecular weight unsaturated aldehyde polymers are insoluble in water. They may be converted into water-soluble derivatives by reaction with water-solubilizing agents, such as aqueous sulfur dioxide, alkali metal bisulfite, ammonium sulfite or bisulfite, sodium hydroxide and the like.

Preferred water-soluble derivatives to be employed in the process comprise the polysulfonic acid or sulfonate derivatives obtained by reacting the high molecular weight polymers with aqueous sulfur dioxide or alkali metal bisulfite. This may be accomplished in a variety of different methods. Preferably, the polymer particles are suspended in an aqueous solution of the desired dissolving agents, such as aqueous sulfur dioxide, and the mixture stirred at room temperature or elevated temperature until the dissolution takes place. The ratio of the polymer and amount of the dissolving agent will depend upon the amount of conversion of the aldehyde groups to the sulfonic acid or sulfonate groups. In general, it is preferred to utilize polymers having from .3 to .9 of the aldehyde groups converted to sulfonic acid or sulfonate groups, and amounts slightly above that needed to reach conversions are preferably employed. Superatmospheric pressures may sometimes be needed to obtain the necessary concentration of the dissolving agent. Temperatures employed for the dissolution preferably vary from about 20° C. to 60° C.

The preparation of several solubilized derivatives is illustrated below.

SOLUBILIZED POLYMER A 10 parts of Polymer A was suspended in water so as to form a 10% slurry. $SO_2$ was bubbled into the solution at room temperature for about one hour The container was sealed and stirred for 24 hours. By that time the polymer had gone into solution. The polymer had an intrinsic viscosity of 1.8 dl./g.

SOLUBILIZED POLYMER B 10 parts of Polymer B was suspended in water to form a 10% aqueous slurry. Sulfur dioxide was bubbled into the solution at room temperature for about one hour. The container was sealed and stirred for 24 hours. At that time, the polymer had gone into solution. This polymer had an intrinsic viscosity of 2.3 dl./g.

SOLUBILIZED POLYMER C 10 parts of Polymer C was suspended in water to form a 10% aqueous slurry. 5 parts of sodium bisulfite were added and the mixture kept at room temperature. The mixture was stirred for several hours until the polymer had gone into solution. This polymer had an intrinsic viscosity of 1.5.

SOLUBILIZED POLYMER D 10 parts of Polymer D was suspended in water to form a 10% aqueous slurry. Sulfur dioxide was bubbled into the solution at room temperature for about one hour. The container was sealed and stirred for 24 hours. By that time, the polymer had gone into solution. This polymer had an intrinsic viscosity of 1.02.

SOLUBILIZED POLYMER E 10 parts of Polymer E was suspended in water to form a 10% aqueous slurry. Sulfur dioxide was bubbled into the solution at room temperature for about one hour. The container was sealed and stirred for 24 hours. By that time, the polymer had gone into solution. This polymer had an intrinsic viscosity of 2.23 dl./g.

SOLUBILIZED POLYMER F 10 parts of Polymer F was suspended in water to form a 10% aqueous slurry. Sulfur dioxide was bubbled into the solution at room temperature for about one hour. The container was sealed and stirred for 24 hours. By that time, the polymer had gone into solution. This polymer had an intrinsic viscosity of 1.1 dl./g.

When recovered from the aqueous reaction mixture the sulfonic acid and salt derivatives appear as substantially white solid polymeric products. They will have substantially the same intrinsic viscosity as the basic polymers used in their preparation, i.e., they will have intrinsic viscosities preferably ranging from 0.3 dl./g. to as high or higher than 3.5 dl./g. On a molecular weight basis, products will have molecular weights preferably ranging from 30,000 to 5,000,000 or higher as determined by the light scattering technique.

The water soluble derivatives will also be characterized by containing a plurality of free sulfonic acid groups or water soluble salt sulfonate groups. For example, the sulfonic acid polymers may contain units as

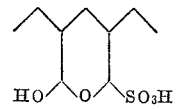

As all the aldehyde groups will not be converted to the sulfonate group, the polymers will also contain some residual hydrated aldehyde groups. They preferably contain from 5% to 20% sulfur.

Preferred products are those having a carbon to sulfur ratio of at least 8 to 1 as described in copending application Ser. No. 194,170, filed May 11, 1962, and the disclosure in that application relative to these adducts and preparation are incorporated herein by reference.

Another preferred type of water-soluble derivative to be employed in the process of the invention include the polyhydroxy polycarboxylic acids and salts thereof obtained by reacting the above-described high molecular weight polymers or their solubilized derivatives as noted above with a basic material having a dissociation constant greater than $2.0 \times 10^{-5}$, and preferably an alkali metal hydroxide. This reaction is also preferably accomplished in the presence of an aldehyde or ketone, and particularly formaldehyde or a material which liberates formaldehyde. The reaction with the basic material gives the salt form and the acid may be by acidification of salt solution.

The basic materials used in the reaction are preferably the alkali metal hydroxides, alkaline earth metal hydroxides, strong amines, ammonium hydroxide and the like. Preferred materials to be employed are the water-soluble hydroxides and basic salts of the alkali metals, sodium, potassium and lithium and ammonium hydroxide and basic salts. The pH value of the reaction mixtures is preferably between about 8 and 14. When expressed on a normality basis, it is preferred to use reaction media having a normality greater than 0.1 N and preferably between 0.5 N and 10 N.

The degree of alkalinity employed will vary depending on the degree of conversion of the aldehyde or hydrated aldehyde groups to the OH and carboxyl groups. Theoretically one mole of caustic is needed for every two aldehyde groups converted. To obtain high degree of conversions, such as 70 to 90% conversions, solutions of higher normality should be employed, while for the lower conversions, lower normality may be utilized.

As noted, the amount of hydroxyl groups and carboxyl groups present on the acid molecule will depend on the extent of reaction with the alkaline material as noted above. Preferred products have up to 90% of the aldehyde groups or hydrated groups converted to the hydroxyl and carboxyl groups. When less than 100% conversion is made, the resulting polymer will, of course, still possess the aldehyde groups or hydrated groups in the same condition as below. Particularly preferred products possess up to 40% of the aldehyde groups in the structural unit as

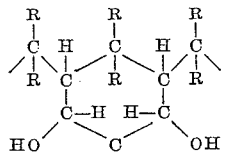

and the remaining groups converted to the structural units as

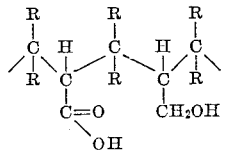

(wherein R is hydrogen or hydrocarbon).

The above-noted reaction with the alkaline material may be accomplished in an inert solvent medium, such as in alcohol and the like. Best results, however, are obtained when conducted in an aqueous medium.

Dilute solutions or suspensions of the polymer are preferred. The concentrations of the polymer in the reaction mixture will preferably vary from about 0.01% to 5% and more preferably from 0.1% to 4%.

The temperature employed in the reaction will generally range from about 0° C. to as high as 60° C. Preferred temperatures range from about 15° C. to 50° C. Atmospheric, subatmospheric or superatmospheric pressures may be utilized as desired.

In most cases, the polymers will dissolve in the alkaline medium in a few minutes and the reaction should be complete in the matter of a few hours. Reaction times generally range from about 20 minutes to about 50 hours.

The resulting hydroxy carboxylic acids will be present in the reaction mixture in the form of the alkaline salt. If this is the desired salt to be used in the treating process, the solution may be used directly in that application. If the salt is not the desired one, the salt may be converted to the acid form by precipitation with acids, such as hydrochloric acid, and then converted to the desired salt by conventional technique, or the salt may be converted directly to the other salt by conventional techniques.

A particularly outstanding and preferred group of salts to be in the process of the invention include the salts of polymeric hydroxy carboxylic acids which have the specific units

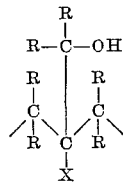

wherein X is —CH₂OH,

or —COOH and R is hydrogen or hydrocarbon.

The polymeric hydroxy carboxylic acids used in preparing the above special salts are obtained by reacting the above-noted polymers of unsaturated aldehydes with a basic material having a dissociation constant greater than $2.0 \times 10^{-5}$, and in the presence of an aldehyde or ketone or material which liberates an aldehyde or ketone, and preferably in the presence of formaldehyde.

The basic material used in the reaction may be as described above for the simple basic reaction with the aldehyde polymer. The pH of the reaction mixture is preferably between 7.1 and 14. When expressed on a normality basis, it is preferred to use reaction media having a normality greater than 0.01 N, and preferably between 0.09 N and 2 N.

The other material employed in the reaction comprises an aldehyde or ketone or mixtures thereof. Examples of aldehyde include, among others, formaldehyde and materials liberating formaldehyde as trioxane, paraformaldehyde and the like, acetaldehyde, propionaldehyde, chloropropionaldehyde, butyraldehyde, isobutyraldehyde, valeroaldehyde, caproic aldehyde, heptoic aldehyde, acrolein, methacrolein, nicotinaldehyde, 2-pyrancarboxyaldehyde, tetrahydropyran-2-carboxyaldehyde, 2-furaldehyde, crotonaldehyde, benzaldehyde, 1-naphthaldehyde, durene dialdehyde, glutaraldehyde, 1-cyclohexene-1-carboxyaldehyde, and 2,4-heptadiene-1-carboxyaldehyde. Preferred aldehydes to be used include those of the formula

wherein R is hydrogen or a hydrocarbon radical, and preferably the aliphatic, cycloaliphatic and aromatic monoaldehydes containing from 1 to 20 carbon atoms, and still more preferably 1 to 12 carbon atoms. Formaldehyde and materials which liberate formaldehyde come under special consideration as the resulting products have particularly outstanding properties for the formation of sizing agents for fibrous materials.

Other materials that may be used in place of or in admixture with the above-described aldehydes include the ketones, and preferably the monoketones, such as, for example, methyl ethyl ketone, methyl isobutyl ketone, dimethyl ketone, diethyl ketone, dibutyl ketone, diisobutyl ketone, ethyl octyl ketone, methyl phenylketone, methyl cyclohexyl ketone, dioctyl ketone, allyl methyl ketone, methyl isopropenyl ketone, beta-chloroallyl methyl ketone, methoxymethyl butyl ketone, and the like. Preferred ketones include those of the formula

wherein R is a hydrocarbon radical. Especially preferred are the aliphatic, cycloaliphatic, aromatic monoketones containing from 3 to 20 carbon atoms, and still more preferably from 3 to 12 carbon atoms. Dialkyl ketones come under special consideration.

The degree of alkalinity employed will vary depending on the degree of conversion of the aldehyde or hydrated aldehyde groups to the OH and carboxyl groups. Theoretically one mole of caustic is needed for every two aldehyde groups converted. To obtain high degree of conversions, e.g., 70% to 90% conversions, solutions of higher normality should be employed, while to obtain low degree of conversions, solutions of lower normality may be utilized. Preferably from 10% to 95% of the groups are converted to the OH and carboxyl groups.

The amount of the aldehyde or ketone employed will vary depending on the degree of conversion of the hydrogen atoms on the alpha carbon atom relative to the aldehyde or hydrated aldehyde groups to the

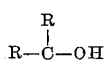

groups. Theoretically one mole of aldehyde or ketone is needed for every unit of aldehyde in the polymer chain to be converted. Preferably from 5% to 95% of the said hydrogen are converted and still more preferably from 10% to 90% of the said hydrogen are converted.

The reaction may be accomplished in an aqueous medium or in an inert solvent medium, such as in alcohol and the like. Best results, however, are obtained when conducted in an aqueous medium.

Dilute solutions or suspensions of the polymer are preferred. The concentration of the polymer in the reaction mixture will preferably vary from about 0.01% to 5% and more preferably from 0.1% to 4%.

The temperature employed in the reaction will generally range from about 0° C. to as high as 60° C. Preferred temperatures range from about 15° C. to 50° C. Atmospheric, subatmospheric or superatmospheric pressures may be utilized as desired.

In most cases, the polymers will dissolve in the alkaline reaction medium in a few minutes and the reaction should be complete in the matter of a few hours. Reaction times generally vary from about 20 minutes to about 50 hours.

The desired hydroxy carboxylic acids will be present in the reaction mixture in the form of the alkaline salt. If this is the desired salt to be utilized in the treating process, the solution may be used directly in the application. If the salt is not the desired one, the salt may be converted to the acid form by the addition of acid, such as hydrochloric acid, and then converted to the desired salt by conventional techniques, or the salt may be converted directly to the other salt by conventional techniques.

The cationic or positive portion of the salt to be employed in the process may vary depending on the medium employed and intended application. Preferred salts include the ammonium, amine and metal salts, and particularly the alkali and alkaline earth metal salts. Examples include, among others, the sodium, potassium, lithium, ammonium, copper, zinc, magnesium, iron, cadmium, calcium, barium, and the like. Preferred metals have atomic weights from 22 to 190.

The salts are preferably prepared by treating the above-described hydroxy carboxylic acids with the desired inorganic salt or hydroxide, such as NaOH, KOH, copper sulfate, zinc sulfate, magnesium chloride, and the like, preferably in the presence of a diluent as water, alcohol and the like.

The preparation of a polyhydroxy polycarboxylic acid derivative by the above method is illustrated below.

POLYHYDROXY POLYCARBOXYLIC ACID DERIVATIVE A 310 parts of a solid polyacrolein having an intrinsic viscosity of 1.6 dl./g. and containing 88.5% water was mixed with 300 parts of water and 25 parts of 37% formalin. 1200 Parts of 1 N NaOH was added to this solution at 5° C. under nitrogen with stirring. The mixture was then allowed to stand at room temperature with stirring. After standing several days, the mixture was diluted with 2000 parts of water. This mixture was made acid to pH of 2.5 with 240 parts of 5 N sulfuric acid. A white granular polymer precipitated. The polymer identified as a polyhydroxy polycarboxylic acid had an intrinsic viscosity of about 1.6 dl./g, an OH value of 0.778 eq./100 g., acidity of 0.4 eq./100 g. and carbonyl value of 0.354 eq./100 g.

When recovered from the aqueous reaction mixture, the hydroxy carboxylic acid and salt derivatives will appear as substantially white solid polymeric products. They will have substantially the same intrinsic viscosity as the polymers used in their preparation. They will also contain a plurality of units as

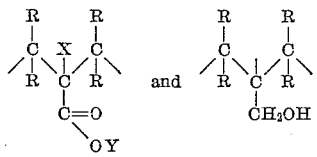

wherein X is hydrogen or

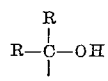

groups wherein R is hydrogen or hydrocarbon radical, and Y is hydrogen or a water-soluble salt material as a metal or ammonium group. As all the aldehyde groups will not be converted to such forms, the polymer will also preferably contain some residual hydrated aldehyde groups.

It is preferred to use the above-noted sulfonic acid or carboxylic acid derivatives rather than the neutralized or salt derivatives as they tend to give products having much better water resistance.

The process of the invention is effected by combining the above-described water-soluble hydroxy-containing material with the above-described water-soluble derivatives of the high molecular weight polymers of unsaturated aldehydes, preferably in alkaline conditions. This reaction can be effected in any type of medium such as water, alcohol, hydrocarbon solvents and the like. It is preferably accomplished in an aqueous medium. In the case of starch, the composition is preferably formed by making an aqueous dispersion of the starch in water by stirring and/or heating, and then adding water-soluble derivative of the aldehyde polymer to this aqueous suspension.

While the amount of the starch employed may vary over a wide range, but is generally preferred to utilize a minimum amount needed to form a suitable uniform dispersion. In the case of starch and starch derivatives, for example, it is preferred to use from 1% to 40% solutions of the starch. Particularly superior results are obtained when the concentration of starch varies from 1% to about 20% by weight.

The amount of the water-soluble derivative of the aldehyde polymer to be employed may also vary over a considerable range, but it is preferred for economic reasons to use only the minimum amount required for imparting the desired water resistance. In general amounts of water-soluble derivative will vary from about .01% to about 20% by weight of the reaction mixture. In the case of starch, it is generally preferred to employ from 1% to 50% by weight of starch and from .01% to 10% by weight of the water-soluble derivative of the aldehyde polymer.

It is desirable to have the solution of the mixture at a pH which is neutral or preferably alkaline. Particularly superior results are obtained when the pH is between 7.5 to 13, and still more preferably between 8 and 12. The pH can be adjusted by the addition of regulators, such as sodium hydroxide, borax and the like.

Other desired materials may be added to the composition as desired. This includes fillers, such as clay, asbestos, wood flour, silica, powdered aluminium, iron, and the like, pigments, other resins, dyes, stabilizers, plasticizers and the like.

The above described compositions may be utilized in greater variety of different applications. As indicated above, they may be used as water soluble sizing agents for textiles, yarns, fibers and the like, as adhesives for the bonding particularly for cellulosic materials together and as surface coatings for various types of surfaces and particularly those derived from cellulose. In the case of the water sizing agents, the compositions may be diluted with water and the textile materials passed into and through the aqueous solution as according to conventional procedure and then removed and dried. In case of the coating compositions, compositions may be spread out as a thin film on the desired surfaces and allowed to dry in air.

The above described compositions are particularly suitable for use as adhesives in the bonding of cellulosic materials such as laminated paper board and corrugated paper board. Laminated paper board is produced commercially by adhesively combining two or more smooth surfaced strips of paper in a continuous process. The manufacture of corrugated paper board is similar, except that at least one of the strips of paper is corrugated and is joined to the adjacent strip or strips of paper only at the tips of the corrugations. In both applications, the compositions of the invention may be applied to the proper surface or surfaces of the paper and the paper sheets placed together and cured under conventional temperatures and pressures, e.g., temperatures of 75 to 175° C. and contact pressure.

Other applications include preparation of paper tube winding, paper bags and the like.

The application can be made by any suitable means, such as spreading with a doctor blade, spraying, dipping, painting and the like. One or both of the surfaces to be bonded may be treated in this manner. In general, it is preferred to merely apply the solution to one surface and superimpose the other surface thereon.

The thickness of the adhesive layer may vary over a wide range. In general, it is preferred to utilize a layer varying from 0.0005 to 0.1 inch thick.

After the adhesive has been applied and the sheets assembled together and pressure applied to secure the bond, the assembly may be allowed to set to cure the bonding material. The curing may be allowed to take place at room temperature, or heat may be applied to hasten the cure. Preferred temperatures range from about 20° C. to about 150° C. Pressures employed may vary from about 25 p.s.i. to 1000 p.s.i.

The adhesive may be used to bond two sheets together or a multiple layer of sheets such as in plywood. The multisheet laminated products are preferably prepared by assembling a lay-up of a plurality of sheets of the fibrous material impregnated with the above-noted adhesive composition, placing the assembly in a press and applying heat and pressure with the aid of the press. Especially with planar cloth laminates, it is helpful in attaining best strengths in all directions to have alternate layers of the material placed at 90° angles from the direction of weave. The assembly of superimposed and impregnated sheets can be cured at elevated temperatures and pressures. Moderate pressures are effective to secure smooth surface laminates such as up to 50 pounds per square inch but higher pressures may be employed if desired.

The laminated products can be prepared as flat sheets or in cured shapes. The form of the press platens will determine the shape of the finished laminate. Thus, curved products can be prepared by use of press platens that are arc-shaped or otherwise curved in one direction as well as platens with double curvature like a segment of a sphere.

The adhesive compositions of the present invention can be used for the bonding of a great variety of different materials, such as those which are fibrous, porous or impervious. Examples of such materials include, among others, wood, glass, glass cloth, fabrics, paper, plaster of paris, metals and the like. Particularly preferred materials are the cellulosic materials as wood, paper and celluosic fabrics as cotton. Results obtained from wood-to-wood bonding as in the preparation of particle board, plywood, and the like, are particularly outstanding. Other important applications include the bonding of paper to wood surfaces as the bonding of kraft paper to lumber surfaces.

The compositions of the invention are particularly valuable in the preparation of coating compositions. Heretofore, starch alone has been used quite extensively as a binder for pigments and the like because of its ease of preparations and availability. However, such starch coatings are not water-resistant as noted above, and a greater quantity of starch than casein is need to bond pigments to the coated stock. Moreover, the adhesiveness of the starch is somewhat limited and the bonding film may be changed by reason of shrinking and separation due to retrogradation of the starch. Because of these difficulties starch has been somewhat limited to the coating field.

As noted above, when the products of the present invention are employed one obtains coatings which have good water resistance, good adhesion and there is no retrogradation of the starch.

The compositions of the invention may be used in a coating composition by mixing it with a suitable quantity of a filler and a dispersing agent in an aqueous medium. Any suitable or conventional filler used in coating compositions, such as, for example, clay, may be used. Similarly, any suitable dispersing agent conventionally used for dispersing the clay in coating compositions may be used. The type of starch which is used in this application will depend to some extent upon the type of coating desired. For example, a roll coating requires a starch of higher viscosity than does a brush coating. Consequently, a less modified starch or one of higher solids content is used for the roll coating.

For a coating composition, for example, one may combine an oxidized starch in combination with a polyacrolein-sodium bisulfite adduct and mix this with clay, water and a dispersing agent. Usually it is desirable to adjust the pH of the composition to a point suitable for satisfactory dispersion of the clay. This point is often near the neutral point or, with certain types of clay slightly on the alkaline side. The clay dispersion and the starch-polyacrolein derivative product may be separately dispersed in water, and the two dispersions mixed to produce the final coating composition.

Coating compositions made in accordance with the above possess improved printability, good water resistance and good adhesion to subsurfaces, such as cellulosic materials, paper, textiles, wood and the like.

Hydrophobic properties are imparted to starch according to the process of the invention as evidenced by the ability of the treated starch to resist swelling and to tolerate the presence of substantial proportions of water without becoming slimy. Obviously this property is discernible only in the products that have been dried down.

By reasons of their water-resistant character, the compositions of the invention are particularly well adapted to inclusion in paper products. The compositions may be included in the paper as a constituent of a water-resistant surface coating or body size, or they may be included as a water-resistant adhesive in such products as laminated fiber board or corrugated fiber board. As used in the present application and claims, the term "paper" is used in a generic sense to include laminated and corrugated fiber boards as well as paper sheets and paper board.

A paper product of this invention which includes a water-resistant starch is characterized by its ability to withstand deterioration by moisture. For instance, a box made from such corrugated board may be stored in a damp place with much less danger of falling to pieces than a similar container made with starch adhesives heretofore available. The improved fiber boards and the like are also less susceptible to attack by fungi or other microorganisms probably by reason of the new polyacrolein derivative.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are by weight.

*Example I*

This example illustrates the preparation of a composition containing starch and a polyacrolein-sodium bisulfite adduct and the use of the composition as an adhesive for paper.

A modified starch solution was prepared by cooking 140 parts of Penford Gum 280 (a low viscosity hydroxy-ethyl ether derivative of corn starch) in 560 parts of water for 30 minutes at 85° C. A polyacrolein-sodium bisulfite adduct was prepared by dissolving polyacrolein having an intrinsic viscosity of 1.7 dl./g. in aqueous sodium bisulfite to give a pH 2.6 solution containing 5% by weight of polyacrolein at a carbon-to-sulfur ratio of 12. This solution was used as a 2.5% by weight polyacrolein (acrolein basis) based on the starch solids. The starch solution and the polyacrolein-bisulfite solutions were adjusted to pH of 9 and 11 and then were combined in such proportions as to give a product having 8.9% by weight starch and 0.22% by weight of the polyacrolein-bisulfite solution. The resulting mixture was a colorless fluid solution which could be easily poured and spread on surfaces. Films spread on wood panels dried to a hard water-insoluble coating.

A portion of the above-described solution was also spread on white rag paper and sheets of paper pressed together to form a laminated product. This combination was dried at 105° C. for 5 minutes and then soaked in tap water at room temperature. A related laminated product prepared from starch alone could be pulled apart in 5 minutes of soaking. The paper product prepared with the above-described combination, however, held the papers together for at least 12 hours when the test was discontinued. The glue solution and glued paper showed no evidence of color.

An improved fiber board was made up by using the above-noted composition to glue together two strips of chip board of the type used in laminated board manufacture. The laminated fiber board produced was dried under pressure for a short time, heated to 100° C. for 30 seconds and then permitted to age. Thereafter, the laminated fiber board was allowed to soak in water and it was found that the board was resistant to deterioration by water at the adhesive bond. A laminated fiber board made with a similar starch solution which was not mixed with the above-described polyacrolein derivative was found to be rapidly deteriorated by water and the adhesive bond rapidly softened and the board could be pulled apart at the adhesive joint.

*Example II*

This example illustrates the preparation of a composition containing potato starch and a polyacrolein-sodium bisulfite adduct and the use of the composition as an adhesive and coating.

A soluble starch solution was prepared by suspending 20 parts of potato starch in 80 parts of water and heating the mixture for 30 minutes at 85° C. At this point the starch had changed into a colloidal suspension. The solution was then cooled to 50° C. A polyacrolein-sodium bisulfite adduct was prepared by dissolving polyacrolein having an intrinsic viscosity of 1.0 dl./g. in aqueous sodium bisulfite to give an adduct having a carbon-to-sulfur ratio of 10:1. This polyacrolein-sodium bisulfite solution and the starch solution were adjusted to pH 9 and 11 and then combined in such proportions as to give a product having 9.0% by weight starch and 0.5% by weight of the adduct.

The resulting mixture was a colorless fluid solution which could be easily poured and spread on surfaces. Films spread on wood panels, dried to a hard water-insoluble coating.

A portion of the above-described solution was also spread on white rag paper and sheets of paper pressed together to form a laminated product. This combination was dried at 105° C. for 5 minutes and then soaked in tap water at room temperature. The paper product prepared with this combination held the papers together for at least 12 hours when the test was discontinued. The glue solution and glued paper showed no evidence of color.

*Example III*

Example II is repeated with the exception that the potato starch is replaced with each of the following: corn starch, rice starch, tapioca starch, hydroxyethylated starch, cyanoethylated starch and root starch. Related results are obtained.

*Example IV*

Examples I to III are repeated with the exception that the polyacrolein derivative employed was an adduct of sulfur dioxide and a polyacrolein having an intrinsic viscosity of 0.9 dl./g. with the adduct having a carbon to sulfur ratio of 9:1. Related results are obtained.

*Example V*

A soluble starch solution was prepared by suspending 20 parts of oxidized starch in 80 parts of water and heating the mixture for 30 minutes at 85° C. The solution was cooled to 50° C. A polyacrolein-sodium bisulfite adduct was prepared by dissolving polyacrolein having an intrinsic viscosity of 2.0 dl./g. in aqueous sodium bisulfite to give an adduct having a carbon-to-sulfur ratio of 8:1. This polyacrolein-sodium bisulfite solution and the starch solution were adjusted to pH 9 to 11 and then combined in such proportions as to give a product having 15% by weight of starch and 0.4% by weight of adduct. The resulting mixture was a colorless fluid solution which could be easily poured and spread on surfaces. Films spread on wood panels dried to a hard water-insoluble coating.

A portion of the above-described solution was mixed with clay, water and a dispersing agent and the resulting mixture spread on paper to form a coating. The resulting coating when dried at 100° C. for a few minutes had good water resistance and good adhesion to the paper.

*Example VI*

Example V is repeated with the exception that the polyacrolein adduct is replaced with a polyacrolein-sulfur dioxide adduct having an intrinsic viscosity of 1.5 dl./g. and a carbon to sulfur ratio of 15:1. Related results are obtained.

*Example VII*

This example illustrates the use of the composition described in Example I for coating paper.

A clay slip was made by mixing 1000 parts by weight of Georgia kaolin clay with 500 parts by weight of water in a plug mill. During the mixing 2 parts by weight of sodium hexameta-phosphate was added.

To the 100 parts of the modified starch composition prepared in Example I was added 15 parts of the clay slip with continuous agitation. This solution was then used for the coating of paper. The coating was applied by means of a blade applicator to a 60 pound per ream ground-wood-coating-stock in such a manner that a coating weight of about 10 to 15 pounds per ream was obtained on the paper after it had been dried. The coating sheets were then dried by application of heat in a conventional manner and the physical properties of the coated paper examined. It was found that the paper was water-resistant.

*Example VIII*

This example illustrates the use of the composition described in Example I for the treatment of textile materials to impart a stiffening effect.

The starch composition prepared in Example I was diluted with water and 5% by weight of aluminum sulfate added as a catalyst. This solution was then used to pad 80 x 80 cotton print cloth at 70% wet pick-up. The treated cloth was tentered to its original dimension on a pin frame and dried at room temperature. Next the frame containing the dried cloth was cured for 5 minutes at 250° C. After ten cycles in an automatic washing machine, the cloth was still stiff and easily ironed.

*Example IX*

Using a pearl starch adhesive, a 10% slurry was prepared by warming to 185° F. in a water batch for 15 minutes. To this was added sufficient polyacrolein-sulfur dioxide having an intrinsic viscosity of 1.5 dl./g. to make the adduct concentration 10% of the total weight of starch. The smoothly flowing mixture was used to cast films on a glass plate. After drying, the films were completely insoluble in water even after boiling for 15 minutes. The mixture was found to be storage stable for over a week.

The above mixture was used to glue two sheets of kraft paper together by spreading the mixture over the paper, pressing the sheets together and allowing the adhesive to dry. A good adhesive bond was obtained in that the substrate failed on pulling the sheets apart. After soaking in water for one hour, the bond retained its integrity and again the paper rather than the adhesive failed upon rupture. A similar sample prepared with unmodified starch parted immediately upon being soaked in water.

We claim as our invention:

1. The process for converting water-soluble starch materials to water resistant materials which comprises mixing and reacting water soluble starch materials with a water-soluble addition polymer of an alpha,beta-ethylenically unsaturated aldehyde containing a plurality of a member of the group consisting of sulfonic acid, sulfonate and carboxyl groups.

2. A process for converting starch to water insoluble derivatives which comprises mixing and reacting the starch with a water-soluble acrolein polymer formed by polymerization of acrolein through the double bond and containing sodium sulfonate groups on the polymer.

3. A process as in claim 2 wherein the water-soluble polymer is a sodium bisulfite adduct of the acrolein polymer.

4. A process as in claim 2 wherein the acrolein polymer has an intrinsic viscosity between 0.3 dl./g. and 3.5 dl./g.

5. A process as in claim 2 wherein the water soluble polymer is a homopolymer of acrolein containing a plurality of sulfonic acid groups, said polymer containing from 0.3 to 0.8 mol of sulfur dioxide per mol of acrolein unit in the polymer.

6. A process for adhering surfaces made of cellulosic material together which comprises bonding the surfaces together with a layer of a mixture of a starch material and a water soluble addition polymer of an alpha,beta-ethylenically unsaturated aldehyde containing a plurality of a member of the group consisting of sulfonic acid, sulfonate and carboxyl groups and allowing the bonded material to set until the adhesive layer is cured.

7. A process for adhering surfaces made of cellulosic material together which comprises applying to at least one of the surfaces to be bonded an aqueous solution containing a mixture of (1) starch and (2) a water soluble addition polymer of acrolein containing a plurality of sodium sulfonate groups, pressing the surfaces together and allowing the combination to set until the adhesive solution has set hard.

8. A process as in claim 7 wherein the surfaces to be bonded are paper.

9. A process as in claim 7 wherein the material to be bonded is wood.

10. A process for preparing an improved fiberboard which comprises applying an aqueous solution containing a mixture of starch and water soluble derivative of an acrolein polymer formed by addition polymerization through the double bond of the acrolein and possessing a plurality of sodium sulfonate groups to the surface of two pieces of chip board, superimposing the treated sheets, pressing and applying heat to accelerate the cure.

11. The process as in claim 10 wherein the water soluble derivative is a polyacrolein-sodium bisulfite adduct containing from 0.3 to 0.8 moles of sulfur dioxide per mol of acrolein per units in the polymer.

12. A process as in claim 10 wherein the pressure applied varied from 50 p.s.i. to 2,000 p.s.i. and the temperature employed varies from 50° F. to 250° F.

13. An adhesive composition comprising an aqueous solution of a starch material and a water soluble derivative of a high molecular weight addition polymer of an alpha,beta-ethylenically unsaturated aldehyde containing a plurality of a member of the group consisting of sulfonic acid, sulfonate and carboxyl groups.

14. An adhesive composition comprising an aqueous solution of starch and a water soluble derivative of a high molecular weight addition polymer of acrolein.

15. An adhesive composition as in claim 14 wherein the water soluble derivative is a polyacrolein-sodium bisulfite adduct having an intrinsic viscosity between 0.5 and 3.5 dl./g. and containing from 0.3 to 0.8 mole of sulfur dioxide per mole of acrolein in the polymer.

16. A process for preparing particle bond which comprises applying an aqueous solution containing starch and an addition homopolymer of acrolein substituted with a plurality of sodium sulfonate groups to the surface of wood chips, pressing the chips together in the desired shape and allowing the assembly to set until the bond is cured.

17. Paper product containing a reaction product of starch and a water-soluble addition polymer of acrolein substituted with a plurality of sodium sulfonate groups.

References Cited by the Examiner

UNITED STATES PATENTS

| | | | |
|---|---|---|---|
| 2,219,447 | 10/1940 | Groff | 260—17.4 |
| 2,360,477 | 10/1944 | Dahle | 260—233.3 |
| 2,458,191 | 1/1949 | Nichols et al. | 260—17.4 |
| 2,657,192 | 10/1953 | Miller et al. | 260—67 |
| 2,771,337 | 11/1956 | Gagarine et al. | 260—17.4 |
| 2,968,581 | 1/1961 | Kress | 260—233.3 |
| 3,032,518 | 5/1962 | Segro | 260—17.4 |
| 3,068,203 | 12/1962 | Schweitzer | 260—67 |
| 3,081,244 | 3/1963 | Campanile | 260—67 |
| 3,129,195 | 4/1964 | June et al. | 260—67 |
| 3,206,433 | 9/1965 | Kern et al. | 260—67 |

LEON J. BERCOVITZ, *Primary Examiner.*

JAMES A. SEIDLECK, *Examiner.*

R. W. GRIFFIN, *Assistant Examiner.*